United States Patent
Rogovin

(10) Patent No.: US 6,411,873 B1
(45) Date of Patent: Jun. 25, 2002

(54) METHOD AND APPARATUS FOR DETERMINING MOTOR ROTATION IN A POWER WINDOW SYSTEM

(76) Inventor: Dan Rogovin, 1643 Stoddard, Thousand Oaks, CA (US) 91360

(*) Notice: Subject to any disclaimer, the term of this patent is extended or adjusted under 35 U.S.C. 154(b) by 0 days.

(21) Appl. No.: 09/587,831

(22) Filed: Jun. 6, 2000

(51) Int. Cl.⁷ .................................................. G06F 7/00
(52) U.S. Cl. ............................ 701/36; 318/567; 701/49
(58) Field of Search ............................... 701/33, 35, 36, 701/49; 324/66, 503, 539, 500; 318/10, 566, 567; 307/9.1, 10.1

(56) References Cited

U.S. PATENT DOCUMENTS 5,315,232 A * 5/1994 Stewart ........................ 701/49
5,854,555 A * 12/1998 Sasaki ......................... 324/539
6,253,135 B1 * 6/2001 Hubacher .................... 324/72

* cited by examiner

Primary Examiner—William A. Cuchlinski, Jr.
Assistant Examiner—Edward Pipala

(57) ABSTRACT

A method and apparatus for determining the position of a rotor of a motor in a power window system is disclosed. The current applied to the motor is measured with respect to time so that the counter electromotive force resulting from rotor inertia may be calculated by the control system of the power window system using a motor equation solved for the counter electromotive force. The time at which the sign of the counter electromotive force changes corresponds to the time at which the rotor has changed direction so that the position of the rotor may be determined with a higher precision.

20 Claims, 3 Drawing Sheets

METHOD AND APPARATUS FOR DETERMINING MOTOR ROTATION IN A POWER WINDOW SYSTEM

FIELD OF THE INVENTION

The present invention generally relates to the field of automotive systems, and particularly to power window systems.

BACKGROUND OF THE INVENTION

In a power window system, when current to the motor that causes the window to move is reversed, inertia will cause the motor to continue to move in the original direction for a brief period of time for a certain distance, typically up to one armature revolution for a duration of approximately 10 milliseconds. Precise resolution of the position of the window by the power window's control system requires knowledge of when the motor reversal actually occurs, and not just the point in time at which the reverse direction signal was applied to the motor. Furthermore, knowledge of the inertia of the window dampers and other mechanical aspects of the power window regulator system are required to obtain a precise window position solution. Thus, it would be highly desirable to be able to determine the motor rotor position in a power window system with a higher level of precision.

SUMMARY OF THE INVENTION

The present invention is directed to a method and apparatus for determining motor rotation in a power window system or the like. The position of the rotor is determined by monitoring the current flowing in the motor and calculating the motor equation solved for counter electromotive force. The time at which the value of the counter electromotive force changes sign corresponds to the time at which the rotor changes direction in response to a new motor control input such that the position of the rotor may be determined with a higher level of precision.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
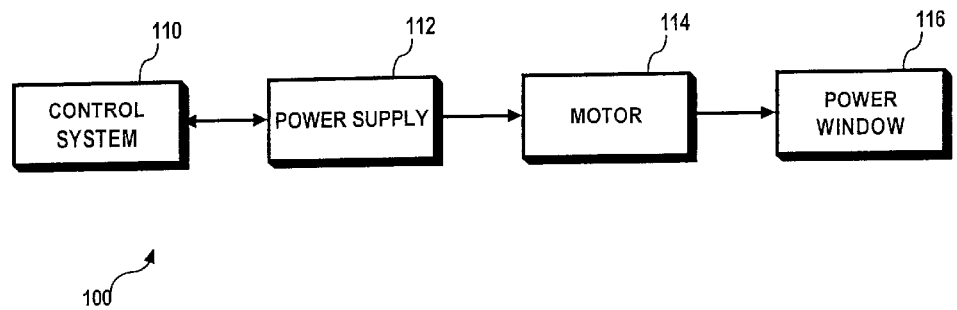
FIG. 1 is a block diagram of a power window system in accordance with the present invention.

Referring now to FIG. 1, a block diagram of a power window system in accordance with the present invention will be discussed. Power window system 100 includes a control system 110 coupled to power supply 112. Control system 110 controls the application of power to motor 114 such that power window 116 is caused to move (e.g., up or down) in response to a control signal provided by control system 110. Power supply 112 includes the battery of the vehicle in which power system 100 is utilized, and may further include other power systems, for example, an alternator and power regulation and conditioning circuitry. Control system 110 may receive an input from a vehicle operator, for example via the use of a window control actuator or switch to cause power window 116 to be raised or lowered according to the desire of the operator. Control system 110 may be, for example, a computer, microcontroller or digital logic based system or the like that is capable of electronically processing an input and providing an appropriate control signal as an output capable of being processed by power window system 100 to implement a control function corresponding to the input. An example of a computer hardware system suitable to be implemented as control system 110 is discussed with respect to FIG. 2.

Figure 2:
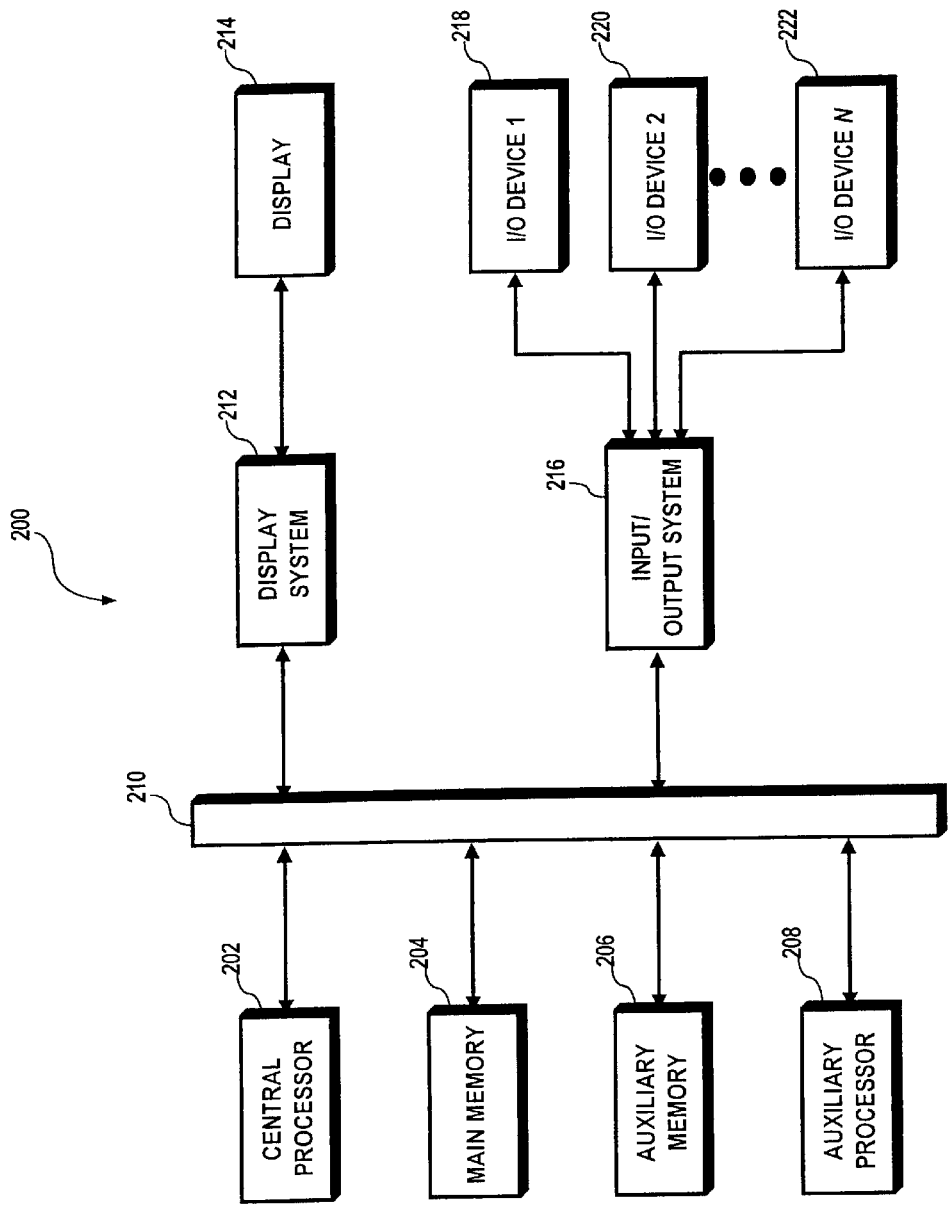
FIG. 2 is a block diagram of a computer based control system capable of being utilized in a pow window system in accordance with the present invention.

Referring now to FIG. 2, a hardware system in accordance with the present invention is shown. The hardware system shown in FIG. 2 is generally representative of the hardware architecture of a computer system embodiment of the present invention. Computer system 200 may be configured to implement one or more subsystems of power window system 100 of FIG. 1, for example, as an embodiment of control system 110. A central processor 202 controls computer system 200. Central processor 202 includes a central processing unit such as a microprocessor or microcontroller for executing programs, performing data manipulations and controlling the tasks of computer system 200. Communication with central processor 202 is implemented through a system bus 210 for transferring information among the components of computer system 200. Bus 210 may include a data channel for facilitating information transfer between storage and other peripheral components of computer system 200. Bus 210 further provides the set of signals required for communication with central processor 202 including a data bus, address bus, and control bus. Bus 210 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 210 may be compliant with any promulgated industry standard. For example, bus 210 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of computer system 200 include main memory 204, auxiliary memory 206, and an auxiliary processor 208 as required. Main memory 204 provides storage of instructions and data for programs executing on central processor 202. Main memory 204 is typically semiconductor based memory such as dynamic random access memory (DRAM) and or static random access memory (SRAM).

Auxiliary memory 206 provides storage of instructions and data that are loaded into the main memory 204 before execution. Auxiliary memory 206 may include semiconductor-based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 206 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Computer system 200 may optionally include an auxiliary processor 208 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Computer system 200 further includes a display system 212 for connecting to a display device 214, and an input/output (I/O) system 216 for connecting to one or more I/O devices 218, 220, up to N number of I/O devices 222. Display system 212 may comprise a video display adapter having all of the components for driving the display device, including video random access memory (VRAM), buffer, and graphics engine as desired. Display device 214 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 216 may comprise one or more controllers or adapters for providing interface functions between one or more of I/O devices 218–222. For example, input/output system 216 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, track pad, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electro-acoustic transducer, microphone, speaker, etc. Input/output system 216 and I/O devices 218–222 may provide or receive analog or digital signals for communication between computer system 200 of the present invention and external devices, networks, or information sources. Input/output system 216 and I/O devices 218–222 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of computer system 200 of FIG. 2 by one having ordinary skill in the art would not depart from the scope or the spirit of the present invention.

Figure 3:
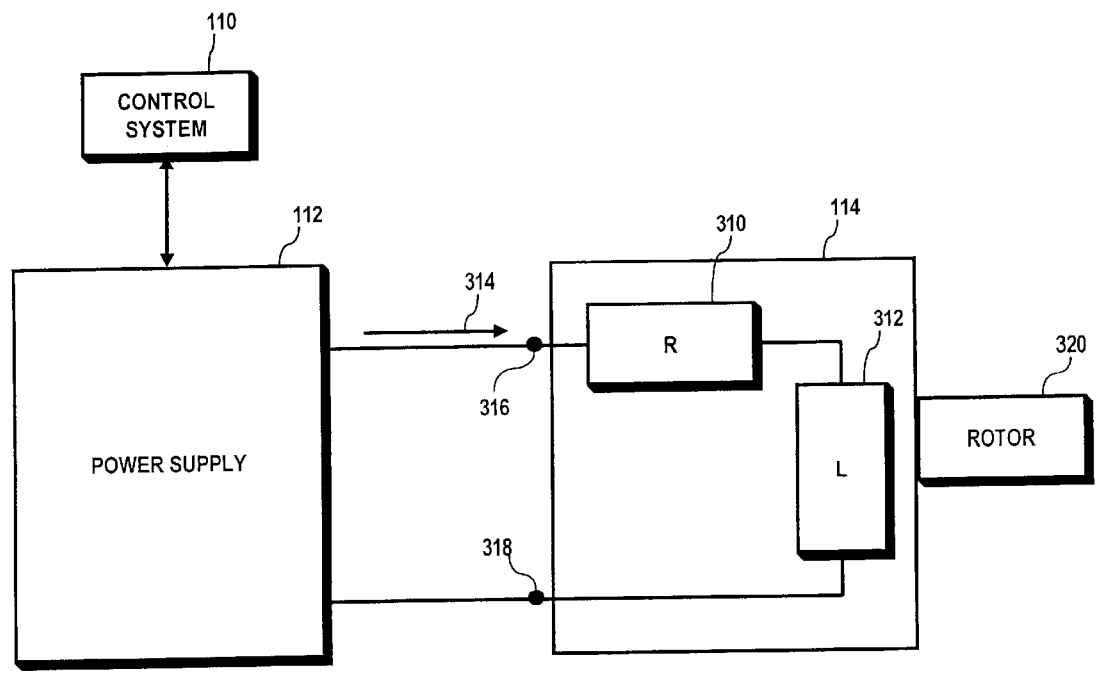
FIG. 3 is a block diagram showing further details of a power window system as shown in FIG. 1 in accordance with the present invention.

Referring now to FIG. 3, a block diagram showing further details of a power window system as shown in FIG. 1 in accordance with the present invention will be discussed. The direction of rotation of the rotor 320 of motor 114 determines the sign of the counter electromotive force ($V_{CEMF}$) produced by the rotation of rotor 320. Generally speaking, $V_{CEMF}$ is difficult or impossible to measure directly, however the value of $V_{CEMF}$ can be inferred by solving the electrical operating equation of motor 114 in combination with determinable electrical measurements of the current 314 flowing through motor 310 and the supply voltage $V_0$ applied to nodes 316 and 318 of motor 114 by power supply 112. The motor equation solved for $V_{CEMF}$ is as follows:

$$V_{CEMF} = V_0 - RI(t) - L\frac{dI(t)}{dt}$$

where R is the motor resistance 310 and L is the motor inductance 312 which are known electrical characteristics of motor 114. The quantity LdI(t)/dt (in volts) is the time derivative of current 314 and can be directly computed (e.g., by control system 110) by taking the difference between two consecutive sampled values of current 314 and scaling in accordance with the time difference between the current samples. This can be computed, for example, as a simple shift operation. The applied voltage $V_0$ and the voltage term RI(t) can be measured directly, and the quantity LdI(t)/dt can be computed. As a result, the magnitude and sign of $V_{CEMF}$ can be determined at all times. The time at which the sign of $V_{CEMF}$ changes indicates the time at which the direction of rotation of rotor 320 changes direction. The thereby determined time value may be used by control system in controlling the operation of power window 116 with a greater precision.

Figure 4:
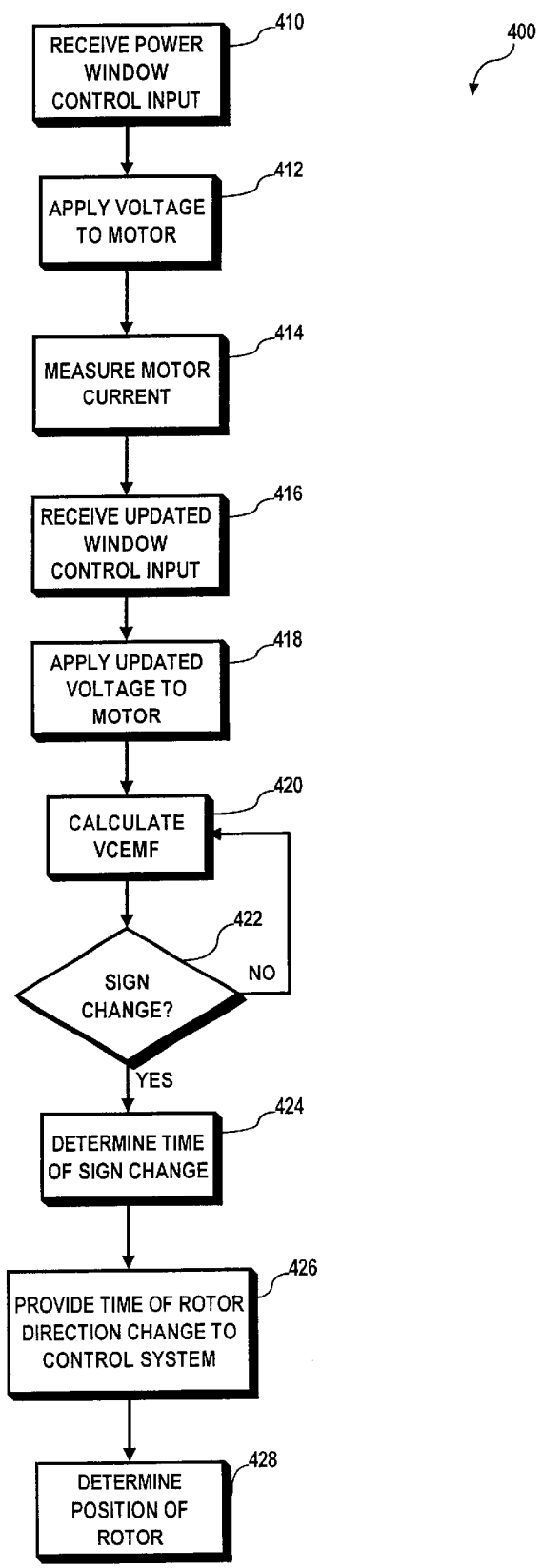
FIG. 4 is a flow diagram of a method for determining motor rotation in a power window system in accordance with the present invention.

Referring now to FIG. 4, a flow diagram of a method for determining motor rotation in a power window system in accordance with the present invention will be discussed. The method 400 may be implemented as a program of instructions storable on a computer readable medium and which are capable of being interpreted by central processor 202 for causing computer system 200 to implement method 400. Although one order of the steps method 400 is disclosed is FIG. 4, the order of the steps of method 400 need not be limited to those shown such that other orders of the steps of method 400 may be implemented without departing from the scope of the invention. Method 400 includes the step 410 of receiving a control input to control power window 116. In response to receiving the control input, control system 110 causes power supply 112 to apply an appropriate voltage to motor 114 at step 412 which results in the movement of power window 116. Motor current 314 is measured at step 414, and is continuously monitored or sampled by control system 110 over time. An updated window control input is subsequently received at step 416 (e.g., the vehicle operator desires the movement of power window 116 to change direction), and control system 110 causes power supply 112 to apply an updated voltage to motor 114 (e.g., the polarity of the applied voltage is reversed) at step 418. As the rotation of rotor 320 continues in the original direction, control system 110 calculates the counter electromotive force $V_{CEMF}$ at step 420 using the motor equation solved for $V_{CEMF}$. A determination is made at step 422 whether the sign of the electromotive force has changed direction (i.e., sign). Until the sign of the electromotive force changes direction, $V_{CEMF}$ is continued to be calculated at step 420. In the event it is determined that $V_{CEMF}$ has changed direction, the time at which the sign of $V_{CEMF}$ has changed is determined at step 424, which represents the time at which the direction of rotation of rotor 320 has changed, the time of the change in direction of rotation of rotor 320 is provided to control system 110 to facilitate higher precision control of the position of power window 116. The position of rotor 320 is determined at step 428 based upon the time at which the sign of $V_{CEMF}$ changes.

It is believed that the method and apparatus for determining motor position in a power window system of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method, comprising:
   receiving a control input for controlling a position of a window;
   applying a voltage to a motor coupled to the window in response to the control input such that a rotor of the motor is caused to rotate;
   measuring current flowing in the motor as a result of the voltage;
   updating the voltage applied to the motor in response to a subsequent control input;
   calculating a counter electromotive force associated with rotation of the rotor in response to said updating step;
   determining whether a sign of the counter electromotive force has changed;
   in the event the sign of the counter electromotive force has changed, determining a time at which the sign of the counter electromotive force has changed; and
   determining a position of the rotor based upon the time at which the sign of the counter electromotive force has changed.

2. A method as claimed in claim 1, said calculating step being applied to a motor equation solved for the counter electromotive force.

3. A method as claimed in claim 1, said measuring step including the steps of periodically sampling the current at predetermined time intervals and dividing two subsequent current samples by one of the predetermined time intervals.

4. A method as claimed in claim 1, said calculating step being based on the equation:

$$V_{CEMF} = V_0 - RI(t) - L\frac{dI(t)}{dt}.$$

5. A program of instructions storable on a computer readable medium for causing a computer to implement steps for determining the position of a window, the steps comprising:
   receiving a control input for controlling a position of a window;
   applying a voltage to a motor coupled to the window in response to the control input such that a rotor of the motor is caused to rotate;
   measuring current flowing in the motor as a result of the voltage;
   updating the voltage applied to the motor in response to a subsequent control input;
   calculating a counter electromotive force associated with rotation of the rotor in response to said updating step;
   determining whether a sign of the counter electromotive force has changed;
   in the event the sign of the counter electromotive force has changed, determining a time at which the sign of the counter electromotive force has changed; and
   determining a position of the rotor based upon the time at which the sign of the counter electromotive force has changed.

6. A program of instructions as claimed in claim 5, said calculating step being applied to a motor equation solved for the counter electromotive force.

7. A program of instructions as claimed in claim 5, said measuring step including the steps of periodically sampling the current at predetermined time intervals and dividing two subsequent current samples by one of the predetermined time intervals.

8. A program of instructions as claimed in claim 5, said calculating step being based on the equation:

$$V_{CEMF} = V_0 - RI(t) - L\frac{dI(t)}{dt}.$$

9. An apparatus, comprising:
   means, coupleable to a window, for moving the window disposed in a vehicle and capable of being disposed in at least two positions from a first one of the at least two positions to a second one of the at least two positions; and
   means for controlling said moving means, said controlling means being capable of determining the position of said moving means with a calculation of a counter electromotive force in the event a counter electromotive force is imparted in said moving means.

10. An apparatus as claimed in claim 9, said moving means comprising a motor having a rotor, said controlling means being capable of determining a position of the rotor with a calculation of a counter electromotive force in the event a counter electromotive force is imparted in the motor.

11. An apparatus as claimed in claim 9, said controlling means including a processor for implementing functions of said controlling means via a program of instructions interpretable by said processor.

12. An apparatus as claimed in claim 9, further comprising means, controlled by said controlling means, for applying power to said moving means.

13. An apparatus as claimed in claim 12, said power applying means including a battery.

14. An apparatus as claimed in claim 9, said controlling means including a microcontroller for implementing functions of said controlling means via microcontroller code interpretable by said microcontroller.

15. A vehicle, comprising:
   a window disposed in the vehicle and capable of being disposed in at least two positions;
   means, coupleable to said window, for moving the window from a first one of the at least two positions to a second one of the at least two positions;
   means for controlling said moving means, said controlling means being capable of determining the position of said moving means with a calculation of a counter electromotive force in the event a counter electromotive force is imparted in said moving means; and an engine disposed in said vehicle, said engine being capable of providing propelling said vehicle and being capable of providing power to said moving means.

16. A vehicle as claimed in claim 15, said moving means comprising a motor having a rotor, said controlling means being capable of determining a position of the rotor with a calculation of a counter electromotive force in the event a counter electromotive force is imparted in the motor.

17. A vehicle as claimed in claim 15, said controlling means including a processor for implementing functions of said controlling means via a program of instructions interpretable by said processor.

18. A vehicle as claimed in claim 15, further comprising means, controlled by said controlling means, for applying power to said moving means.

19. A vehicle as claimed in claim 18, said power applying means including a battery.

20. A vehicle as claimed in claim 15, said controlling means including a microcontroller for implementing functions of said controlling means via microcontroller code interpretable by said microcontroller.

* * * * *